US012624140B2

(12) United States Patent
Furukawa et al.

(10) Patent No.: US 12,624,140 B2
(45) **Date of Patent: *May 12, 2026**

(54) COMPOSITION CONTAINING COMPOUND HAVING POLYOXYALKYLENE CHAIN

(71) Applicant: Resonac Corporation, Tokyo (JP)

(72) Inventors: Naoki Furukawa, Tokyo (JP); Yuki Nakamura, Tokyo (JP); Hiroshi Yokota, Tokyo (JP); Tsuyoshi Morimoto, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/779,131

(22) PCT Filed: Nov. 26, 2020

(86) PCT No.: PCT/JP2020/044000

§ 371 (c)(1),
(2) Date: May 24, 2022

(87) PCT Pub. No.: WO2021/107002

PCT Pub. Date: Jun. 3, 2021

(65) Prior Publication Data

US 2022/0403081 A1 Dec. 22, 2022

(30) Foreign Application Priority Data

Nov. 29, 2019 (JP) ................................ 2019-216615
Feb. 6, 2020 (JP) ................................ 2020-019064

(51) Int. Cl.
*C08L 71/02* (2006.01)
*C08F 222/10* (2006.01)

(52) U.S. Cl.
CPC ........ *C08F 222/1063* (2020.02); *C08L 71/02* (2013.01)

(58) Field of Classification Search
CPC ............ C08F 222/1063; C08F 290/062; C08L 71/02; C09J 4/00; C09D 4/06; C07C 67/14; C07C 69/602
See application file for complete search history.

(56) References Cited

U.S. PATENT DOCUMENTS

| | | | | |
|---|---|---|---|---|
| 5,415,896 | A * | 5/1995 | Mulvihill ............ | C10M 173/02 508/579 |
| 5,660,178 | A | 8/1997 | Kantner et al. | |
| 6,274,688 | B1 | 8/2001 | Nakagawa et al. | |
| 9,493,682 | B2 | 11/2016 | Levandoski et al. | |
| 2003/0203011 | A1* | 10/2003 | Abuelyaman ....... | C08F 290/142 424/445 |
| 2006/0122298 | A1 | 6/2006 | Menon et al. | |
| 2010/0101724 | A1 | 4/2010 | Schuft et al. | |
| 2010/0331462 | A1 | 12/2010 | Levandoski et al. | |
| 2013/0165593 | A1 | 6/2013 | Ichiryu et al. | |
| 2013/0298398 | A1 | 11/2013 | Miyasaka et al. | |
| 2014/0220243 | A1 | 8/2014 | Levandoski et al. | |
| 2015/0153647 | A1* | 6/2015 | Itagaki ...................... | G03F 7/20 216/13 |
| 2022/0403081 | A1 | 12/2022 | Furukawa et al. | |
| 2022/0403082 | A1 | 12/2022 | Matsubara et al. | |
| 2023/0002661 | A1* | 1/2023 | Nakamura ............ | C08K 13/02 |
| 2023/0016868 | A1 | 1/2023 | Matsubara et al. | |
| 2024/0132645 | A1 | 4/2024 | Furukawa et al. | |
| 2024/0132646 | A1 | 4/2024 | Furukawa et al. | |

FOREIGN PATENT DOCUMENTS

| | | |
|---|---|---|
| CN | 1101065 | 4/1995 |
| CN | 101087860 | 12/2007 |
| CN | 101343527 | 1/2009 |
| CN | 101392042 | 3/2009 |
| CN | 102712814 | 10/2012 |
| CN | 104303106 | 1/2015 |
| CN | 104974694 | 10/2015 |
| CN | 107710385 | 2/2018 |
| CN | 109504351 | 3/2019 |
| CN | 109562597 | 4/2019 |
| CN | 110706926 | 1/2020 |
| CN | 113302734 | 8/2021 |
| GB | 2582002 | 9/2020 |
| JP | S64-065112 | 3/1989 |
| JP | H1-190711 | 7/1989 |

(Continued)

OTHER PUBLICATIONS

Extended Search Report in corresponding European Application No. 20892676.6, dated Dec. 19, 2022.
SOEI Patent and Law Firm, Statement of Related Matters, dated Jun. 24, 2022.
International Preliminary Report on Patentability with Written Opinion dated Jun. 9, 2022 for PCT/JP2020/043978.
International Preliminary Report on Patentability with Written Opinion dated Jun. 9, 2022 for PCT/JP2020/043980.
International Preliminary Report on Patentability with Written Opinion dated Jun. 9, 2022 for PCT/JP2020/043999.
International Preliminary Report on Patentability with Written Opinion dated Jun. 9, 2022 for PCT/JP2020/044000.
Cai, Z. J. et al., "Crystallization behavior, thermal property and biodegradation of poly(3-hydroxybutyrate)/poly (ethylene glycol) grafting copolymer", Polymer Degradation and Stability, 2011, 96, p. 1602-p. 1609.

(Continued)

*Primary Examiner* — Jiangtian Xu
(74) *Attorney, Agent, or Firm* — SHIPWAY IP

(57) ABSTRACT

A composition containing a compound represented by the following formula (1):

(1)

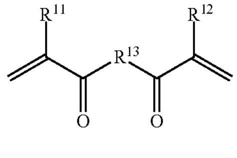

wherein $R^{11}$ and $R^{12}$ each independently represent a hydrogen atom or a methyl group, and $R^{13}$ represents a divalent group having a polyoxyalkylene chain, and wherein the polyoxyalkylene chain has 100 or more of oxyalkylene groups.

6 Claims, No Drawings

(56) References Cited

FOREIGN PATENT DOCUMENTS

| | | | |
|---|---|---|---|
| JP | H6-157667 | | 6/1994 |
| JP | H7-322962 | | 12/1995 |
| JP | H8-504853 | | 5/1996 |
| JP | H11-080723 | | 3/1999 |
| JP | H11-246885 | | 9/1999 |
| JP | 2001-192425 | | 7/2001 |
| JP | 2004-026971 | | 1/2004 |
| JP | 2004-168740 | | 6/2004 |
| JP | 2004-231913 | | 8/2004 |
| JP | 2005-249377 | | 9/2005 |
| JP | 2005-264361 | | 9/2005 |
| JP | 2005-289043 | | 10/2005 |
| JP | 2006-022163 | | 1/2006 |
| JP | 2006-096898 | | 4/2006 |
| JP | 2008-081676 | | 4/2008 |
| JP | 2008-127421 | | 6/2008 |
| JP | 2008-522001 | | 6/2008 |
| JP | 2008-239860 | | 10/2008 |
| JP | 2009-120826 | | 6/2009 |
| JP | 2009-249613 | | 10/2009 |
| JP | 2009-263542 | | 11/2009 |
| JP | 2009-265640 | | 11/2009 |
| JP | 2010-532806 | | 10/2010 |
| JP | 2011-111517 | | 6/2011 |
| JP | 2011-195773 | | 10/2011 |
| JP | 2012-033434 | | 2/2012 |
| JP | 2012-167263 | | 9/2012 |
| JP | 2012-201786 | | 10/2012 |
| JP | 2012188507 | * | 10/2012 |
| JP | 2013-018842 | | 1/2013 |
| JP | 2013-203977 | | 10/2013 |
| JP | 2015-192120 | | 11/2015 |
| JP | 2017-122139 | | 7/2017 |
| JP | 2017-128688 | | 7/2017 |
| JP | 2018-111796 | | 7/2018 |
| JP | 2018-153845 | | 10/2018 |
| JP | 2018-172565 | | 11/2018 |
| JP | 2020-059824 | | 4/2020 |
| JP | 2020-076031 | | 5/2020 |
| JP | 2021-098772 | | 7/2021 |
| JP | 2021-113944 | | 8/2021 |
| JP | 2022-055457 | | 4/2022 |
| JP | 2023-062580 | | 5/2023 |
| KR | 20190056448 | | 5/2019 |
| TW | 202035580 | | 10/2020 |
| WO | 99/055633 | | 11/1999 |
| WO | 2011/048802 | | 4/2011 |
| WO | 2012/026368 | | 3/2012 |
| WO | 2016/051915 | | 4/2016 |
| WO | 2018/005997 | | 1/2018 |
| WO | 2019/193677 | | 10/2019 |
| WO | 2019/220663 | | 11/2019 |
| WO | 2019/235465 | | 12/2019 |
| WO | 2020/095858 | | 5/2020 |
| WO | 2020/149193 | | 7/2020 |
| WO | 2021/044260 | | 3/2021 |
| WO | 2021/107001 | | 6/2021 |
| WO | 2021/107002 | | 6/2021 |
| WO | 2022/181446 | | 9/2022 |
| WO | 2022/181454 | | 9/2022 |

OTHER PUBLICATIONS

International Search Report dated Feb. 2, 2021 for PCT/JP2020/043978.
International Search Report dated Feb. 2, 2021 for PCT/JP2020/043980.
International Search Report dated Jan. 12, 2021 for PCT/JP2020/043999.
International Search Report dated Jan. 12, 2021 for PCT/JP2020/044000.
"SOEI Statement of Related Matters", Oct. 16, 2025.
"Poly(ethylene glycol) diacrylate", Polysciences, 2025, p. 1.
"Polyethylene glycol monomethyl ether M.W. 4000", Avantor, 2025, p. 1.
International Search Report dated Jul. 25, 2023 for PCT/JP2023/017974.
International Search Report dated Sep. 21, 2021 for PCT/JP2021/026993.
International Search Report dated Apr. 19, 2022 for PCT/JP2022/006432.
International Search Report dated Apr. 19, 2022 for PCT/JP2022/006479.
International Search Report dated Aug. 1, 2023 for PCT/JP2023/017982.
International Search Report dated Nov. 1, 2022 for PCT/JP2022/032287.
International Preliminary Report on Patentability with Written Opinion dated Nov. 28, 2024 for PCT/JP2023/017974.
International Preliminary Report on Patentability with Written Opinion dated Nov. 28, 2024 for PCT/JP2023/017982.
International Preliminary Report on Patentability with Written Opinion dated Mar. 14, 2024 for PCT/JP2022/032287.
Extended Search Report in corresponding European Application No. 23807581.6, dated Jul. 18, 2025.
Shin-Nakamura Chemical Co., Ltd., "NK Ester List Products", 2026, p. 1-p. 10.

* cited by examiner

COMPOSITION CONTAINING COMPOUND HAVING POLYOXYALKYLENE CHAIN

CROSS-REFERENCE TO RELATED APPLICATIONS

This application is a 35 U.S.C. § 371 national phase application of PCT/JP2020/044000, filed on Nov. 26, 2020, which claims priority to Japanese Patent Application No. 2019-216615, filed on Nov. 29, 2019, and to Japanese Patent Application No. 2020-019064, filed on Feb. 6, 2020.

TECHNICAL FIELD

The present invention relates to a composition containing a compound having a polyoxyalkylene chain.

BACKGROUND ART

In an electronic component or the like that generates heat during use, a thermally conductive material (sometimes referred to as a thermal dissipation material) called a thermal interface material (TIM) is used to efficiently dissipate heat. The TIM contains, for example, a polymer and a thermally conductive filler.

As the polymer as described above, a suitable polymer is selected according to the use (application target) of the TIM or the like. Specifically, for example, a composition containing a polymer may be required to have low viscosity and excellent handling properties, and a cured product of the composition may be required to have low elasticity. On the other hand, for example, Patent Literature 1 discloses a curable silicone composition which has good handling workability and forms a cured product having a low elastic modulus.

CITATION LIST

Patent Literature

Patent Literature 1: Japanese Unexamined Patent Publication No. 2008-081676

SUMMARY OF INVENTION

Technical Problem

According to studies conducted by the present inventors, a cured product of a composition having improved handling properties using a low-viscosity polymer may be required to have a high elongation at break. However, it is not necessarily easy to realize these at the same time.

Therefore, an object of the present invention is to improve the elongation at break of a cured product of a composition while improving the handleability of the composition.

Solution to Problem

The inventors of the present invention conducted a thorough study, and as a result, the inventors found that a cured product of a composition containing a specific compound having a polyoxyalkylene chain and having two (meth) acryloyl groups can form a cured product having a high elongation at break while having a low viscosity and excellent handleability. According to some aspects, the present invention provides the following [1] to [7].

[1] A composition containing a compound represented by the following formula (1):

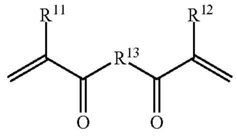

(1)

wherein $R^{11}$ and $R^{12}$ each independently represent a hydrogen atom or a methyl group, and $R^{13}$ represents a divalent group having a polyoxyalkylene chain, and wherein the polyoxyalkylene chain has 100 or more of oxyalkylene groups.

[2] The composition according to [1], wherein the polyoxyalkylene chain contains an oxyethylene group.

[3] The composition according to [1], wherein the polyoxyalkylene chain contains an oxypropylene group.

[4] The composition according to [1], wherein the polyoxyalkylene chain is a copolymer chain containing an oxyethylene group and an oxypropylene group.

[5] The composition according to [4], wherein the copolymer chain is a random copolymer chain.

[6] The composition according to any one of [1] to [5], wherein the compound represented by the formula (1) has a weight average molecular weight of 5000 or more.

[7] The composition according to any one of [1] to [6], wherein the compound represented by the formula (1) has a viscosity at 25° C. of 200 Pa·s or less.

Advantageous Effects of Invention

According to the present invention, it is possible to improve the elongation at break of a cured product of a composition while improving the handleability of the composition.

DESCRIPTION OF EMBODIMENTS

Hereinafter, embodiments of the present invention will be described in detail. Incidentally, the present invention is not intended to be limited to the following embodiments.

The term "(meth)acryloyl" according to the present specification means "acryloyl" and "methacryloyl" corresponding thereto, and the same also applies to similar expressions such as "(meth)acrylate" and "(meth)acryl".

The weight average molecular weight (Mw) according to the present specification means a value measured using gel permeation chromatography (GPC) under the following conditions and determined by using polystyrene as a standard substance.

Measuring equipment: HLC-8320GPC (product name, manufactured by Tosoh Corp.)

Analysis column: TSKgel SuperMultipore HZ-H (three columns connected) (product name, manufactured by Tosoh Corp.)

Guide column: TSKguardcolumn SuperMP (HZ)-H (product name, manufactured by Tosoh Corp.)

Eluent: THF

Measurement temperature: 25° C.

An embodiment of the present invention is a composition containing a compound represented by the following formula (1):

(1)

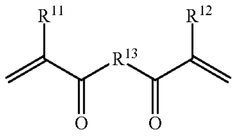

wherein $R^{11}$ and $R^{12}$ each independently represent a hydrogen atom or a methyl group, and $R^{13}$ represents a divalent group having a polyoxyalkylene chain.

According to an embodiment, any one of $R^{11}$ and $R^{12}$ may be a hydrogen atom, while the other may be a methyl group; according to another embodiment, both $R^{11}$ and $R^{12}$ may be a hydrogen atom; and according to still another embodiment, both $R^{11}$ and $R^{12}$ may be a methyl group.

The polyoxyalkylene chain has 100 or more of oxyalkylene groups. Since the composition of the present embodiment contains the compound having the structure represented by the formula (1) and having 100 or more of oxyalkylene groups in the polyoxyalkylene chain, it is possible to form a cured product having low viscosity, excellent handleability, and excellent elongation at break. In one embodiment, the cured product of the composition may have low elasticity and high strength. From these viewpoints, the number of oxyalkylene groups in the polyoxyalkylene chain is preferably 130 or more, 180 or more, 200 or more, 220 or more, 250 or more, 270 or more, 300 or more, or 320 or more. The number of oxyalkylene groups in the polyoxyalkylene chain may be 600 or less, 570 or less, or 530 or less.

According to an embodiment, the polyoxyalkylene chain contains an oxyethylene group (i.e., a structural unit represented by the following formula (2)).

(2)

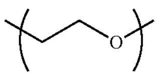

As a result, the strength of the cured product can be further increased while further suppressing an increase of the viscosity of the composition.

In this case, $R^{13}$ may be a divalent group having a polyoxyethylene chain, and the compound represented by the formula (1) is preferably a compound represented by the following formula (1-2) (polyethylene glycol di(meth)acrylate):

(1-2)

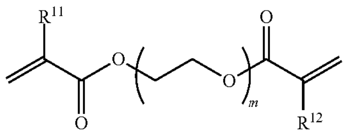

wherein $R^{11}$ and $R^{12}$ have the same meanings as $R^{11}$ and $R^{12}$ in the formula (1), respectively; and m represents an integer of 100 or more. m may have the same lower limit and upper limit as the number of oxyalkylene groups described above.

According to another embodiment, the polyoxyalkylene chain contains an oxypropylene group (i.e., a structural unit represented by the following formula (3)).

(3)

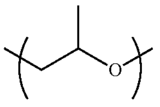

As a result, handling of the composition can be further facilitated.

In this case, $R^{13}$ may be a divalent group having a polyoxypropylene chain, and the compound represented by the formula (1) is preferably a compound represented by the following formula (1-3) (polypropylene glycol di(meth) acrylate):

(1-3)

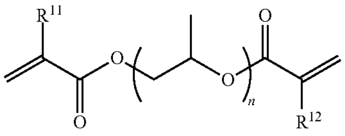

wherein $R^{11}$ and $R^{12}$ have the same meanings as $R^{11}$ and $R^{12}$ in the formula (1), respectively, and n represents an integer of 100 or more. m may have the same lower limit and upper limit as the number of oxyalkylene groups described above.

According to another embodiment, from the viewpoint of facilitating handling of the composition and further achieving low elasticity, high elongation, and high strength of the cured product, the polyoxyalkylene chain is preferably a copolymer chain containing the oxyethylene group and the oxypropylene group. The copolymer chain may be any one of an alternating copolymer chain, a block copolymer chain, or a random copolymer chain. From the viewpoint of further facilitating the handling of the composition, the copolymer chain is preferably a random copolymer chain.

In each of the embodiments described above, the polyoxyalkylene chain may have, as a structural unit, an oxyalkylene group having 4 to 5 carbon atoms, such as an oxytetramethylene group, an oxybutylene group, or an oxypentylene group, in addition to the oxyethylene group and the oxypropylene group.

$R^{13}$ may also be a divalent group further having an additional organic group in addition to the above-mentioned polyoxyalkylene chain. The additional organic group may be a chain-like group other than the polyoxyalkylene chain, and the additional organic group may be, for example, a methylene chain (chain having $-CH_2-$ as a structural unit), a polyester chain (chain containing —COO— in a structural unit), or a polyurethane chain (chain containing —OCON— in a structural unit).

For example, the compound represented by the formula (1) may be a compound represented by the following formula (1-4):

(1-4)

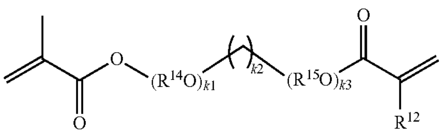

wherein $R^{11}$ and $R^{12}$ have the same meanings as $R^{11}$ and $R^{12}$ in the formula (1), respectively; $R^{14}$ and $R^{15}$ each independently represent an alkylene group having 2 to 5 carbon atoms; and k1 and k3 each independently represent an integer of 100 or more, and k2 is an integer of 2 or more.

k1 and k3 may have the same lower limit and upper limit as the number of oxyalkylene groups described above. k2 may be, for example, an integer of 16 or less.

Each of $R^{14}$ and $R^{15}$, which are present in plurality, may be identical with each other or may be different from each other. Each of $R^{14}$ and $R^{15}$, which are present in plurality, preferably contains an ethylene group and a propylene group. That is, a polyoxyalkylene chain represented by $(R^{14}O)_{k1}$ and a polyoxyalkylene chain represented by $(R^{15}O)_{k3}$ are each preferably a copolymer chain containing an oxyethylene group and an oxypropylene group.

From the viewpoint that the cured product has lower elasticity and excellent elongation, the weight average molecular weight of the compound represented by the formula (1) is preferably 5000 or more, 6000 or more, 7000 or more, 8000 or more, 9000 or more, 10000 or more, 11000 or more, 12000 or more, 13000 or more, 14000 or more, or 15000 or more. From the viewpoint of further facilitating the adjustment of the viscosity of the composition, the weight average molecular weight of the compound represented by the formula (1) is preferably 100000 or less, 80000 or less, 60000 or less, 40000 or less, or 30000 or less.

The compound represented by the formula (1) may be liquid at 25° C. In this case, from the viewpoint of further enhancing the handleability of the composition, the viscosity at 25° C. of the compound represented by the formula (1) is preferably 500 Pa·s or less, more preferably 350 Pa·s or less, even more preferably 300 Pa·s or less, and particularly preferably 200 Pa·s or less. The viscosity at 25° C. of the compound represented by the formula (1) may be 0.1 Pa·s or more, 0.2 Pa·s or more, or 0.3 Pa·s or more.

The compound represented by the formula (1) may be solid at 25° C. In this case, from the viewpoint of further enhancing the handleability of the composition, the compound represented by the formula (1) is preferably liquid at 50° C. Furthermore, in this case, from the viewpoint of further enhancing the handleability of the composition, the viscosity at 50° C. of the compound represented by the formula (1) is preferably 100 Pa·s or less, more preferably 50 Pa·s or less, even more preferably 30 Pa·s or less, and particularly preferably 20 Pa·s or less. The viscosity at 50° C. of the compound represented by the formula (1) may be 0.1 Pa·s or more, 0.2 Pa·s or more, or 0.3 Pa·s or more.

The viscosity means a value measured based on JIS Z 8803, and specifically, the viscosity means a value measured by using an E type viscometer (for example, manufactured by Toki Sangyo Co., Ltd., PE-80L). Incidentally, compensation of the viscometer can be carried out based on JIS Z 8809-JS14000. The viscosity of the compound represented by the formula (1) can be adjusted by adjusting the weight average molecular weight of the compound.

The content of the compound represented by the formula (1), for example, may be 1% by mass or more, 5% by mass or more, 10% by mass or more, 20% by mass or more, 30% by mass or more, 40% by mass or more, 50% by mass or more, 60% by mass or more, 70% by mass or more, 80% by mass or more, or 90% by mass or more, and may be 99% by mass or less, 95% by mass or less, 90% by mass or less, 80% by mass or less, 70% by mass or less, 60% by mass or less, 50% by mass or less, 40% by mass or less, 30% by mass or less, 20% by mass or less, or 10% by mass or less, based on the total amount of the composition.

The composition may contain only the compound represented by the formula (1) as the polymerizable compound. The composition may contain an additional polymerizable compound (the details will be described below) other than the compound represented by the formula (1). In this case, the content of the compound represented by the formula (1) may be 10 parts by mass or more, 20 parts by mass or more, 30 parts by mass or more, 40 parts by mass or more, 50 parts by mass or more, 60 parts by mass or more, 70 parts by mass or more, 80 parts by mass or more, or 90 parts by mass or more, and may be 90 parts by mass or less, 80 parts by mass or less, 70 parts by mass or less, 60 parts by mass or less, 50 parts by mass or less, 40 parts by mass or less, 30 parts by mass or less, 20 parts by mass or less, or 10 parts by mass or less, with respect to 100 parts by mass of the sum of the compound represented by the formula (1) and the additional polymerizable compound (hereinafter, referred to as "sum of the contents of the polymerizable components").

For the purpose of adjusting the physical properties of the composition and the like, the composition may further contain an additional polymerizable compound that can be copolymerized with the above-mentioned compound represented by the formula (1).

The additional polymerizable compound may be, for example, a compound having one (meth)acryloyl group. This compound may be, for example, an alkyl (meth) acrylate. The additional polymerizable compound may also be a compound having an aromatic hydrocarbon group, a group containing a polyoxyalkylene chain, a group containing a heterocyclic ring, an alkoxy group, a phenoxy group, a group containing a silane group, a group containing a siloxane bond, a halogen atom, a hydroxyl group, a carboxyl group, an amino group, or an epoxy group, in addition to the one (meth)acryloyl group. Particularly, as the composition contains an alkyl (meth)acrylate, the viscosity of the composition can be adjusted. Furthermore, as the composition contains a compound having a hydroxyl group, a carboxyl group, an amino group, or an epoxy group in addition to the (meth)acryloyl group, the adhesiveness of the composition and a cured product thereof to a member can be further enhanced.

The alkyl group in the alkyl (meth)acrylate (alkyl group moiety other than the (meth)acryloyl group) may be linear, branched, or alicyclic. The number of carbon atoms of the alkyl group may be, for example, 1 to 30. The number of carbon atoms of the alkyl group may be 1 to 11, 1 to 8, 1 to 6, or 1 to 4, and may be 12 to 30, 12 to 28, 12 to 24, 12 to 22, 12 to 18, or 12 to 14.

Examples of the alkyl (meth)acrylate having a linear alkyl group include an alkyl (meth)acrylate having a linear alkyl group having 1 to 11 carbon atoms, such as methyl (meth) acrylate, ethyl (meth)acrylate, propyl (meth)acrylate, butyl (meth)acrylate, pentyl (meth)acrylate, n-hexyl (meth)acrylate, n-heptyl (meth)acrylate, octyl (meth)acrylate, nonyl (meth)acrylate, decyl (meth)acrylate, or undecyl (meth) acrylate; and an alkyl (meth)acrylate having a linear alkyl group having 12 to 30 carbon atoms, such as dodecyl (meth)acrylate (lauryl (meth)acrylate), tetradecyl (meth) acrylate, hexadecyl (meth)acrylate (cetyl (meth)acrylate), octadecyl (meth)acrylate (stearyl (meth)acrylate), docosyl (meth)acrylate (behenyl (meth)acrylate), tetracosyl (meth) acrylate, hexacosyl (meth)acrylate, or octacosyl (meth)acrylate.

Examples of the alkyl (meth)acrylate having a branched alkyl group include an alkyl (meth)acrylate having a branched alkyl group having 1 to 11 carbon atoms, such as s-butyl (meth)acrylate, t-butyl (meth)acrylate, isobutyl (meth)acrylate, isopentyl (meth)acrylate, isoamyl (meth) acrylate, isooctyl (meth)acrylate, 2-ethylhexyl (meth)acrylate, isononyl (meth)acrylate, or isodecyl (meth)acrylate; and an alkyl (meth)acrylate having a branched alkyl group having 12 to 30 carbon atoms, such as isomyristyl (meth) acrylate, 2-propylheptyl (meth)acrylate, isoundecyl (meth) acrylate, isododecyl (meth)acrylate, isotridecyl (meth)acrylate, isopentadecyl (meth)acrylate isohexadecyl (meth) acrylate, isoheptadecyl (meth)acrylate, isostearyl (meth) acrylate, or decyltetradecanyl (meth)acrylate.

Examples of the alkyl (meth)acrylate having an alicyclic alkyl group (cycloalkyl group) include cyclohexyl (meth) acrylate, 3,3,5-trimethylcyclohexyl (meth)acrylate, isobornyl (meth)acrylate, terpene (meth)acrylate, and dicyclopentanyl (meth)acrylate.

The compound having a (meth)acryloyl group and an aromatic hydrocarbon group may be benzyl (meth)acrylate or the like.

Examples of the compound having a group containing a (meth)acryloyl group and a group containing a polyoxyalkylene chain include polyethylene glycol (meth)acrylate, methoxy polyethylene glycol (meth)acrylate, polypropylene glycol (meth)acrylate, methoxy polypropylene glycol (meth)acrylate, polybutylene glycol (meth)acrylate, and methoxy polybutylene glycol (meth)acrylate.

Examples of the compound having a (meth)acryloyl group and a group containing a heterocyclic ring include tetrahydrofurfuryl (meth)acrylate.

Examples of the compound having a (meth)acryloyl group and an alkoxy group include 2-methoxyethyl acrylate.

Examples of the compound having a (meth)acryloyl group and a phenoxy group include phenoxyethyl (meth) acrylate.

Examples of the compound having a (meth)acryloyl group and a group containing a silane group include 3-acryloxypropyltriethoxysilane, 10-methacryloyloxydecyltrimethoxysilane, 10-acryloyloxydecyltrimethoxysilane, 10-methacryloyloxydecyltriethoxysilane, and 10-acryloyloxydecyltriethoxysilane.

Examples of the compound having a (meth)acryloyl group and a group containing a siloxane bond include silicone (meth)acrylate.

Examples of the compound having a (meth)acryloyl group and a halogen atom include (meth)acrylates having fluorine atoms, such as trifluoromethyl (meth)acrylate, 2,2,2-trifluoroethyl (meth)acrylate, 1,1,1,3,3,3-hexafluoro-2-propyl (meth)acrylate, perfluoroethylmethyl (meth)acrylate, perfluoropropylmethyl (meth)acrylate, perfluorobutylmethyl (meth)acrylate, perfluoropentylmethyl (meth)acrylate, perfluorohexylmethyl (meth)acrylate, perfluoroheptylmethyl (meth)acrylate, perfluorooctylmethyl (meth)acrylate, perfluorononylmethyl (meth)acrylate, perfluorodecylmethyl (meth)acrylate, perfluoroundecylmethyl (meth)acrylate, perfluorododecylmethyl (meth)acrylate, perfluorotridecylmethyl (meth)acrylate, perfluorotetradecylmethyl (meth)acrylate, 2-(trifluoromethyl)ethyl (meth)acrylate, 2-(perfluoroethyl)ethyl (meth)acrylate, 2-(perfluoropropyl) ethyl (meth)acrylate, 2-(perfluorobutyl)ethyl (meth)acrylate, 2-(perfluoropentyl)ethyl (meth)acrylate, 2-(perfluorohexyl) ethyl (meth)acrylate, 2-(perfluoroheptyl)ethyl (meth)acrylate, 2-(perfluorooctyl)ethyl (meth)acrylate, 2-(perfluorononyl)ethyl (meth)acrylate, 2-(perfluorotridecyl)ethyl (meth)acrylate, and 2-(perfluorotetradecyl)ethyl (meth)acrylate.

Examples of the compound having a (meth)acryloyl group and a hydroxyl group include a hydroxyalkyl (meth) acrylate such as 2-hydroxyethyl (meth)acrylate, 2-hydroxypropyl (meth)acrylate, 3-hydroxypropyl (meth)acrylate, 2-hydroxybutyl (meth)acrylate, 4-hydroxybutyl (meth)acrylate, 6-hydroxyhexyl (meth)acrylate, 8-hydroxyoctyl (meth) acrylate, 10-hydroxydecyl (meth)acrylate, or 12-hydroxylauryl (meth)acrylate; and a hydroxyalkylcycloalkane (meth)acrylate such as (4-hydroxymethylcyclohexyl)methyl (meth)acrylate.

Examples of the compound having a (meth)acryloyl group and a carboxyl group include (meth)acrylic acid, carboxyethyl (meth)acrylate, carboxypentyl (meth)acrylate, phthalic acid monohydroxyethyl acrylate (for example, "ARONIX M5400" manufactured by Toagosei Co., Ltd.), and 2-acryloyloxyethyl succinate (for example, "NK ESTER A-SA" manufactured by Shin-Nakamura Chemical Co., Ltd.).

Examples of the compound having a (meth)acryloyl group and an amino group include N,N-dimethylaminoethyl (meth)acrylate, N,N-diethylaminoethyl (meth)acrylate, N,N-dimethylaminopropyl (meth)acrylate, and N,N-diethylaminopropyl (meth)acrylate.

Examples of the compound having a (meth)acryloyl group and an epoxy group include glycidyl (meth)acrylate, glycidyl α-ethyl (meth)acrylate, glycidyl α-n-propyl (meth) acrylate, glycidyl α-n-butyl (meth)acrylate, 3,4-epoxybutyl (meth)acrylate, 4,5-epoxypentyl (meth)acrylate, 6,7-epoxyheptyl (meth)acrylate, 6,7-epoxyheptyl α-ethyl (meth)acrylate, 3-methyl-3,4-epoxybutyl (meth)acrylate, 4-methyl-4,5-epoxypentyl (meth)acrylate, 5-methyl-5,6-epoxyhexyl (meth)acrylate, β-methylglycidyl (meth)acrylate, and β-methylglycidyl α-ethyl (meth)acrylate.

The content of the additional polymerizable compound, for example, may be 1% by mass or more, 5% by mass or more, 10% by mass or more, 20% by mass or more, 30% by mass or more, 40% by mass or more, 50% by mass or more, 60% by mass or more, 70% by mass or more, 80% by mass or more, or 90% by mass or more, and may be 99% by mass or less, 95% by mass or less, 90% by mass or less, 80% by mass or less, 70% by mass or less, 60% by mass or less, 50% by mass or less, 40% by mass or less, 30% by mass or less, 20% by mass or less, or 10% by mass or less, based on the total amount of the composition.

The content of the additional polymerizable compound, for example, may be 10 parts by mass or more, 20 parts by mass or more, 30 parts by mass or more, 40 parts by mass or more, 50 parts by mass or more, 60 parts by mass or more, 70 parts by mass or more, 80 parts by mass or more, or 90 parts by mass or more, and may be 90 parts by mass or less, 80 parts by mass or less, 70 parts by mass or less, 60 parts by mass or less, 50 parts by mass or less, 40 parts by mass or less, 30 parts by mass or less, 20 parts by mass or less, or 10 parts by mass or less, based on 100 parts by mass of the sum of the contents of the polymerizable components.

The composition may further contain a polymerization initiator. The polymerization initiator may be, for example, a thermal polymerization initiator that generates radicals by heat, a photopolymerization initiator that generates radicals by light, or the like. The polymerization initiator is preferably a thermal polymerization initiator.

When the composition contains a thermal polymerization initiator, a cured product of the composition can be obtained by applying heat to the composition. In this case, the composition may be a composition that is cured by heating at preferably 105° C. or higher, more preferably 110° C. or higher, and even more preferably 115° C. or higher, and may be a composition that is cured by heating at, for example, 200° C. or lower, 190° C. or lower, or 180° C. or lower. The heating time at the time of heating the composition may be appropriately selected according to the composition of the composition so that the composition is suitably cured.

Examples of the thermal polymerization initiator include azo compounds such as azobisisobutyronitrile, azobis-4-methoxy-2,4-dimethylvaleronitrile, asobiscyclohexanone-1-carbonitrile, and azodibenzoyl; and organic peroxides such as benzoyl peroxide, lauroyl peroxide, di-t-butyl peroxide, di-t-hexyl peroxide, di-t-butyl peroxy hexahydroterephthalate, t-butyl peroxy-2-ethylhexanoate, 1,1-t-butylperoxy-3,3,5-trimethylcyclohexane, t-butylperoxyisopropyl carbonate. Regarding the thermal polymerization initiator, these may be used singly or in combination of two or more kinds thereof.

When the composition contains a photopolymerization initiator, a cured product of the composition can be obtained by, for example, irradiating the composition with light (for example, light containing at least a portion of wavelengths of 200 to 400 nm (ultraviolet light)). The conditions for light irradiation may be appropriately set according to the type of the photopolymerization initiator.

The photopolymerization initiator may be, for example, a benzoin ether-based photopolymerization initiator, an acetophenone-based photopolymerization initiator, an α-ketol-based photopolymerization initiator, an aromatic sulfonyl chloride-based photopolymerization initiator, a photoactive oxime-based photopolymerization initiator, a benzoin-based photopolymerization initiator, a benzyl-based photopolymerization initiator, a benzophenone-based photopolymerization initiator, a ketal-based photopolymerization initiator, a thioxanthone-based photopolymerization initiator, or an acylphosphine oxide-based photopolymerization initiator.

Examples of the benzoin ether-based photopolymerization initiator include benzoin methyl ether, benzoin ethyl ether, benzoin propyl ether, benzoin isopropyl ether, benzoin isobutyl ether, 2,2-dimethoxy-1,2-diphenylethan-1-one (for example, "IRGACURE 651" manufactured by BASF SE), and anisole methyl ether. Examples of the acetophenone-based photopolymerization initiator include 1-hydroxycyclohexyl phenyl ketone (for example, "IRGACURE 184" manufactured by BASF SE), 4-phenoxydichloroacetophenone, 4-t-butyldichloroacetophenone, 1-[4-(2-hydroxyethoxy)-phenyl]-2-hydroxy-2-methyl-1-propan-1-one (for example, "IRGACURE 2959" manufactured by BASF SE), 2-hydroxy-2-methyl-1-phenylpropan-1-one (for example, "IRGACURE 1173" manufactured by BASF SE), and methoxyacetophenone.

Examples of the α-ketol-based photopolymerization initiator include 2-methyl-2-hydroxypropiophenone and 1-[4-(2-hydroxyethyl)-phenyl]-2-hydroxy-2-methylpropan-1-one. Examples of the aromatic sulfonyl chloride-based photopolymerization initiator include 2-naphthalenesulfonyl chloride. Examples of the photoactive oxime-based photopolymerization initiator include 1-phenyl-1,1-propanedione-2-(o-ethoxycarbonyl)-oxime.

Examples of the benzoin-based photopolymerization initiator include benzoin. Examples of the benzyl-based photopolymerization initiator include benzyl. Examples of the benzophenone-based photopolymerization initiator include benzophenone, benzoyl benzoate, 3,3'-dimethyl-4-methoxybenzophenone, polyvinylbenzophenone, and α-hydroxycyclohexyl phenyl ketone. Examples of the ketal-based photopolymerization initiator include benzyl dimethyl ketal. Examples of the thioxanthone-based photopolymerization initiator include thioxanthone, 2-chlorothioxanthone, 2-methylthioxanthone, 2,4-dimethylthioxanthone, isopropylthioxanthone, 2,4-dichlorothioxanthone, 2,4-diethylthioxanthone, isopropylthioxanthone, 2,4-diisopropylthioxanthone, and dodecylthioxanthone.

Examples of the acylphosphine-based photopolymerization initiator include bis(2,6-dimethoxybenzoyl)phenylphosphine oxide, bis(2,6-dimethoxybenzoyl)(2,4,4-trimethylpenyl)phosphine oxide, bis(2,6-dimethoxybenzoyl)-n-butylphosphine oxide, bis(2,6-dimethoxybenzoyl)-(2-methylpropan-1-yl)phosphine oxide, bis(2,6-dimethoxybenzoyl)-(1-methylpropan-1-yl)phosphine oxide, bis(2,6-dimethoxybenzoyl)-t-butylphosphine oxide, bis(2,6-dimethoxybenzoyl)cyclohexylphosphine oxide, bis(2,6-dimethoxybenzoyl)octylphosphine oxide, bis(2-methoxybenzoyl)(2-methylpropan-1-yl)phosphine oxide, bis(2-methoxybenzoyl)(1-methylpropan-1-yl)phosphine oxide, bis(2,6-diethoxybenzoyl)(2-methylpropan-1-yl)phosphine oxide, bis(2,6-diethoxybenzoyl)(1-methylpropan-1-yl)phosphine oxide, bis(2,6-dibutoxybenzoyl)(2-methylpropan-1-yl)phosphine oxide, bis(2,4-dimethoxybenzoyl)(2-methylpropan-1-yl)phosphine oxide, bis(2,4,6-trimethylbenzoyl)(2,4-dipentoxyphenyl)phosphine oxide, bis(2,6-dimethoxybenzoyl)benzylphosphine oxide, bis(2,6-dimethoxybenzoyl)-2-phenylpropylphosphine oxide, bis(2,6-dimethoxybenzoyl)-2-phenylethylphosphine oxide, bis(2,6-dimethoxybenzoyl) benzylphosphine oxide, bis(2,6-dimethoxybenzoyl)-2-phenylpropylphosphine oxide, bis(2,6-dimethoxybenzoyl)-2-phenylethylphosphine oxide, 2,6-dimethoxybenzoylbenzylbutylphosphine oxide, 2,6-dimethoxybenzoylbenzyloctylphosphine oxide, bis(2,4,6-trimethylbenzoyl)-2,5-diisopropylphenylphosphine oxide, bis(2,4,6-trimethylbenzoyl)-2-methylphenylphosphine oxide, bis(2,4,6-trimethylbenzoyl)-4-methylphenylphosphine oxide, bis(2,4,6-trimethylbenzoyl)-2,5-diethylphenylphosphine oxide, bis(2,4,6-trimethylbenzoyl)-2,3,5,6-tetramethylphenylphosphine oxide, bis(2,4,6-trimethylbenzoyl)-2,4-di-n-butoxyphenylphosphine oxide, 2,4,6-trimethylbenzoyldiphenylphosphine oxide, bis(2,6-dimethoxybenzoyl)-2,4,4-trimethylpentylphosphine oxide, bis(2,4,6-trimethylbenzoyl)isobutylphosphine oxide, 2,6-dimethoxybenzoyl-2,4,6-trimethylbenzoyl-n-butylphosphine oxide, bis(2,4,6-trimethylbenzoyl)phenylphosphine oxide, bis(2,4,6-trimethylbenzoyl)-2,4-dibutoxyphenylphosphine oxide, 1,10-bis[bis(2,4,6-trimmethylbenzoyl)phosphine oxide] decane, and tri(2-methylbenzoyl)phosphine oxide.

The above-mentioned photopolymerization initiator may be used singly or in combination of two or more kinds thereof.

From the viewpoint of suitably carrying out polymerization, the content of the polymerization initiator is preferably 0.01 parts by mass or more, more preferably 0.02 parts by mass or more, and even more preferably 0.05 parts by mass or more, with respect to 100 parts by mass of the sum of the contents of the polymerizable components. From the viewpoint that the molecular weight of the polymer in the cured product of the composition is in a suitable range and that decomposition products are suppressed, the content of the polymerization initiator is preferably 10 parts by mass or less, more preferably 5 parts by mass or less, even more preferably 3 parts by mass or less, and particularly preferably 1 part by mass or less, with respect to 100 parts by mass of the sum of the contents of the polymerizable components.

From the viewpoint of enhancing the thermal reliability of a cured product of the composition, the composition may further contain an oxidation inhibitor. The oxidation inhibitor may be, for example, a phenol-based oxidation inhibitor, a benzophenone-based oxidation inhibitor, a benzoate-based oxidation inhibitor, a hindered amine-based oxidation inhibitor, or a benzotriazole-based oxidation inhibitor, and the oxidation inhibitor is preferably a phenol-based oxidation inhibitor.

The phenol-based oxidation inhibitor has, for example, a hindered phenol structure (hindered phenol ring). The hindered phenol structure (hindered phenol ring) may be, for example, a structure in which a t-butyl group is bonded to any one position or both positions of the ortho-position with respect to the hydroxyl group in a phenol ring. The phenol-based oxidation inhibitor has one or more, preferably two or more, more preferably three or more, and even more preferably four or more of such a hindered phenol ring.

The content of the oxidation inhibitor may be 0.1% by mass or more, 0.2% by mass or more, or 0.3% by mass or more, and may be 10% by mass or less, 9% by mass or less, 8% by mass or less, or 7% by mass or less, based on the total amount of the composition.

The composition can further contain additional additives as necessary. Examples of the additional additives include a plasticizer (for example, a tackifier), a filler (for example, a thermally conductive filler), a surface treatment agent (for example, a silane coupling agent), a dispersant, a curing accelerator, a colorant, a crystal nucleating agent, a thermal stabilizer, a foaming agent, a flame retardant, a vibration damping agent, a dehydrating agent, and a flame retardant aid (for example, a metal oxide). The content of the additional additives may be 0.1% by mass or more and may be 30% by mass or less, based on the total amount of the composition.

The composition is preferably liquid at 25° C. from the viewpoint of further enhancing the handleability. The composition may be solid at 25° C., and in that case, it is preferable that the composition becomes liquid as a result of heating (for example, at 50° C. or higher) from the viewpoint of further enhancing the handleability.

[Composition Set]

According to an embodiment of the present invention, a multi-liquid type composition set can be provided. The composition set according to an embodiment is a composition set containing a first liquid containing an oxidizing agent and a second liquid containing a reducing agent. At least one of the first liquid and the second liquid contains the above-mentioned compound represented by the formula (1). By mixing the first liquid and the second liquid, the oxidizing agent reacts with the reducing agent to cause free radicals to be generated, and polymerization of polymerizable components such as the compound represented by the formula (1) proceeds. According to the composition set according to the present embodiment, a cured product of a mixture of the first liquid and the second liquid is immediately obtained by mixing the first liquid and the second liquid. That is, according to the composition set, a cured product of the composition is obtained at a high speed.

In the composition set, it is preferable that the first liquid contains the oxidizing agent and the compound represented by the formula (1), and the second liquid contains the reducing agent and the compound represented by the formula (1).

The content of the compound represented by the formula (1) based on the total liquid amount constituting the composition set (for example, in the case of a two-liquid type composition set, the total amount of the first liquid and the second liquid) may be similar to the range of the above-mentioned content of the compound represented by the formula (1) based on the total amount of the composition.

The oxidizing agent contained in the first liquid plays the role as a polymerization initiator (radical polymerization initiator). The oxidizing agent may be, for example, an organic peroxide or an azo compound. The organic peroxide may be, for example, a hydroperoxide, a peroxydicarbonate, a peroxy ester, a peroxy ketal, a dialkyl peroxide, or a diacyl peroxide. The azo compound may be AIBN (2,2'-azobisisobutyronitrile), γ-65 (azobisdimethylvaleronitrile), or the like. Regarding the oxidizing agent, one kind thereof can be used alone, or two or more kinds thereof can be used in combination.

Examples of the hydroperoxide include diisopropylbenzene hydroperoxide and cumene hydroperoxide.

Examples of the peroxydicarbonate include di-n-propyl peroxydicarbonate, diisopropyl peroxydicarbonate, bis(4-t-butylcyclohexyl) peroxydicarbonate, di-2-ethoxymethoxy peroxydicarbonate, di(2-ethylhexylperoxy) dicarbonate, dimethoxybutyl peroxydicarbonate, and di(3-methyl-3-methoxybutyl peroxy) dicarbonate.

Examples of the peroxy ester include cumyl peroxyneodecanoate, 1,1,3,3-tetramethylbutyl peroxyneodecanoate, 1-cyclohexyl-1-methylethyl peroxyneodecanoate, t-hexyl peroxyneodecanoate, t-butyl peroxypivalate, 1,1,3,3-tetramethylbutyl peroxy-2-ethylhexanoate, 2,5-dimethyl-2,5-di(2-ethylhexanoylperoxy)hexane, 1-cyclohexyl-1-methylethyl peroxy-2-ethylhexanoate, t-hexyl peroxy-2-ethylhexanoate, t-butyl peroxy-2-ethylhexanoate, t-butyl peroxyisobutyrate, 1,1-bis(t-butylperoxy)cyclohexane, t-butyl peroxy-3,5,5-trimethylhexanoate, t-butyl peroxylaurate, 2,5-dimethyl-2,5-di(m-toluoylperoxy)hexane, t-hexyl peroxybenzoate, and t-butyl peroxyacetate.

Examples of the peroxy ketal include 1,1-bis(t-hexylperoxy)-3,3,5-trimethylcyclohexane, 1,1-bis(t-hexylperoxy)cyclohexane, 1,1-bis(t-butylperoxy)-3,3,5-trimethylcyclohexane, 1,1-bis(t-butylperoxy)cyclododecane, and 2,2-bis(t-butylperoxy)decane.

Examples of the dialkyl peroxide include α,α'-bis(t-butylperoxy)diisopropylbenzene, dicumyl peroxide, 2,5-dimethyl-2,5-di(t-butylperoxy)hexane, and t-butyl cumyl peroxide.

Examples of the diacyl peroxide include isobutyl peroxide, 2,4-dichlorobenzoyl peroxide, 3,5,5-trimethylhexanoyl peroxide, octanoyl peroxide, lauroyl peroxide, stearoyl peroxide, succinic peroxide, benzoyl peroxytoluene, and benzoyl peroxide.

From the viewpoint of storage stability, the oxidizing agent is preferably a peroxide, more preferably a hydroperoxide, and even more preferably cumene hydroperoxide.

The content of the oxidizing agent may be 0.1% by mass or more, 0.5% by mass or more, or 1% by mass or more, and may be 10% by mass or less, 5% by mass or less, or 3% by mass or less, based on the total liquid amount constituting the composition set.

The reducing agent contained in the second liquid may be, for example, a tertiary amine, a thiourea derivative, or a transition metal salt. Examples of the tertiary amine include triethylamine, tripropylamine, tributylamine, and N,N-dimethyl-para-toluidine. Examples of the thiourea derivative include 2-mercaptobenzimidazole, methylthiourea, dibutylthiourea, tetramethylthiourea, and ethylenethiourea. Examples of the transition metal salt include cobalt naphthenate, copper naphthenate, and vanadyl acetylacetonate.

From the viewpoint of having an excellent curing rate, the reducing agent is preferably a thiourea derivative or a transition metal salt. The thiourea derivative may be, for example, ethylenethiourea. From a similar viewpoint, the transition metal salt is preferably vanadyl acetylacetonate.

The content of the reducing agent may be 0.05% by mass or more, 0.10% by mass or more, or 0.3% by mass or more, and may be 5% by mass or less, 3% by mass or less, or 1% by mass or less, based on the total liquid amount constituting the composition set.

The composition set may further contain additional polymerizable compounds and additives that can be used in the above-mentioned composition. These components may be contained in any one or both of the first liquid and the second liquid or may be contained in a third liquid, which is different from the first liquid and the second liquid. The content of these components based on the total liquid amount constituting the composition set may be similar to the range of the content of these components based on the total amount of the above-mentioned composition.

Since the above-described composition or composition set can realize low elasticity, high elongation, and high strength in the cured product thereof while having low viscosity, it is suitable for applications such as a thermally conductive material (also referred to as a thermal dissipation material), a pressure sensitive adhesive, a structural adhesive, a binder for a battery, a stress relaxation agent, a sealing agent, a coating agent, and a paint. Similarly, the cured product of the above-described composition or the cured product of a mixture of the composition set can realize low elasticity, high elongation, and high strength, and thus is suitable for each of the above-described applications.

EXAMPLES

Hereinafter, the present invention will be more specifically described by way of Examples; however, the present invention is not intended to be limited to the following Examples.

In the Examples, each of the following components was used.

(A-1) A compound represented by the following formula (1-5):

(1-5)

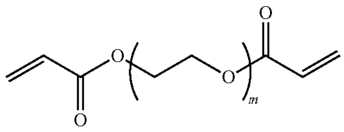

which was synthesized by the procedure shown below (weight average molecular weight: 8000, mixture in which m in the formula (1-5) is an integer of approximately 180±3, viscosity at 50° C.: 10 Pa·s (solid at 25° C.))

(A-2) A compound represented by the formula (1-6):

(1-6)

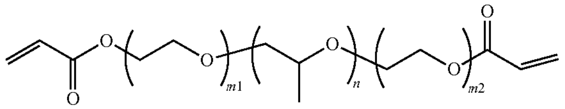

which was synthesized by the procedure shown below (weight average molecular weight: 9400, mixture in which m1+m2 in the formula (1-6) is an integer of approximately 160±5 and n is an integer of approximately 38±5, viscosity at 50° C.: 8 Pa·s (solid at 25° C.))

(A-3) A compound represented by the formula (1-7):

(1-7)

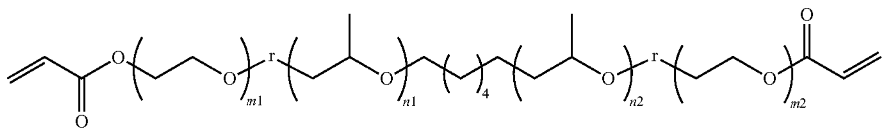

wherein -r- is a reference symbol representing random copolymerization, which was synthesized by the procedure shown below (weight average molecular weight: 15000, mixture in which m1+m2 in the formula (1-7) is approximately 252±5 and n1+n2 is approximately an integer of 63±5 (m1+n1≥100, m2+n2≥100), viscosity at 25° C.: 50 Pa·s)

(A-4) A compound represented by the formula (1-8):

(1-8)

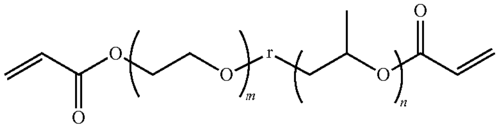

wherein -r- is a reference symbol representing random copolymerization, which was synthesized by the procedure shown below (weight average molecular weight: 16000, mixture in which m in the formula (1-8) is an integer of approximately 246±5 and n is an integer of approximately 105±5, viscosity at 25° C.: 55 Pa·s)

[Synthesis of Compound Represented by Formula (1-5)]

A 500-mL flask configured to contain a stirrer, a thermometer, a nitrogen gas inlet tube, a discharge tube, and a heating jacket was used as a reactor, 120 g of polyethylene glycol #6000 and 300 g of toluene were added to the reactor, the mixture was stirred at 45° C. and a speed of stirring rotation of 250 times/min, nitrogen was caused to flow at a rate of 100 mL/min, and the mixture was stirred for 30 minutes. Subsequently, the temperature was decreased to 25° C., after completion of temperature decrease, 2.9 g of acryloyl chloride was added dropwise to the reactor, and the mixture was stirred for 30 minutes. Subsequently, 3.8 g of triethylamine was added dropwise thereto, and the mixture was stirred for 2 hours. Subsequently, the temperature was increased to 45° C., and the mixture was reacted for 2 hours. The reaction liquid was filtered, the filtrate was subjected to solvent removal, and a compound represented by the formula (1-5) was obtained.

[Synthesis of Each of Compounds Represented by Formulae (1-6) to (1-8)]

The compound represented by the formula (1-6) was obtained by the same method as the method for synthesizing the compound represented by the formula (1-5), except that polyethylene glycol #6000 was changed to polyoxyethylene polyoxypropylene glycol (141 g of "NEWPOL PE78" manufactured by Sanyo Chemical Industries, Ltd.). The compound represented by the formula (1-7) was obtained by the same method as the method for synthesizing the compound represented by the formula (1-5), except that polyethylene glycol #6000 was changed to a glycol having a polyoxyalkylene chain (225 g of "NEWPOL 7511-90000" manufactured by Sanyo Chemical Industries, Ltd.). The compound represented by the formula (1-8) was obtained by the same method as the method for synthesizing the compound represented by the formula (1-5), except that polyethylene glycol #6000 was changed to 240 g of polyoxyethylene polyoxypropylene glycol (molecular weight 16000).

In Examples and Comparative Examples, the following components were used as necessary in addition to the components described above.

(a-1) A compound represented by the following formula (a-1):

(a-1)

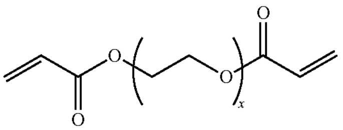

(weight average molecular weight: 1000, mixture in which x in the formula (a-1) is an integer of approximately 21±3)

(a-2) A compound represented by the following formula (a-2):

(a-2)

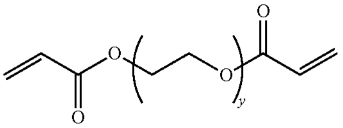

(weight average molecular weight: 700, mixture in which y in the formula (a-2) is an integer of approximately 11±3)

(a-3) A compound represented by the above formula (a-2) (weight average molecular weight: 4000, mixture in which y in the formula (a-2) is an integer of approximately 58±3)

(B-1) 2-Ethylhexyl acrylate (manufactured by Nippon Shokubai Co., Ltd.)

(B-2) 4-Hydroxybutyl acrylate (manufactured by Osaka Organic Chemical Industry, Ltd.)

(B-3) 2-Acryloyloxyethyl succinate ("NK ESTER A-SA" manufactured by Shin-Nakamura Chemical Co., Ltd.)

(B-4) Isodecyl acrylate ("FAI11A" manufactured by Hitachi Chemical Co., Ltd.)

(C) Thermal polymerization initiator (di-t-butyl peroxide)

(D) Rosin ester (plasticizer, "TACKIFIER KE311" manufactured by Arakawa Chemical Industries, Ltd.)

[Production of Composition and Cured Product]

Various components were mixed at the blending ratio shown in Table 1, and each of compositions of Examples and Comparative Examples was obtained. Next, each of the compositions was charged into a mold (formed from SUS plates) having a size of 10 cm×10 cm×0.2 mm, the mold was covered with a SUS plate as a top lid, and then the composition was cured by heating for 15 minutes under the conditions of 135° C., to obtain cured products of the compositions having a thickness of 0.2 mm.

[Measurement of Elongation at Break, Breaking Strength and Tensile Modulus]

The elongation at break, tensile modulus, and breaking strength of each of the cured products at 25° C. were measured using a tensile tester ("Autograph EZ-TEST EZ-S" manufactured by SHIMADZU CORPORATION). Regarding the measurement, measurement was performed for the cured product having a shape of 0.2 mm (film thickness)×5 mm (width)×30 mm (length) based on JIS K7161 under the conditions of a distance between chucks of 20 mm and a tensile rate of 5 mm/min.

TABLE 1

| | | Example | | | | | | | | | Comparative Example | | |
|---|---|---|---|---|---|---|---|---|---|---|---|---|---|
| | | 1 | 2 | 3 | 4 | 5 | 6 | 7 | 8 | 9 | 1 | 2 | 3 |
| Blending ratio | (A-1) | 50 | — | — | — | — | — | — | — | — | — | — | — |
| (parts by mass) | (A-2) | — | 50 | — | — | — | — | — | — | — | — | — | — |
| | (A-3) | — | — | 50 | 50 | 40 | — | — | 30 | — | — | — | — |
| | (A-4) | — | — | — | — | — | 40 | 30 | — | 30 | — | — | — |
| | (a-1) | — | — | — | — | — | — | — | — | — | 50 | — | — |
| | (a-2) | — | — | — | — | — | — | — | — | — | — | 50 | — |
| | (a-3) | — | — | — | — | — | — | — | — | — | — | — | 50 |
| | (B-1) | 30 | 30 | 30 | 50 | — | — | — | — | — | 30 | 30 | 30 |
| | (B-2) | 20 | — | 20 | — | 20 | 20 | 20 | 17 | 17 | 20 | 20 | 20 |
| | (B-3) | — | 20 | — | — | — | — | — | — | — | — | — | — |
| | (B-4) | — | — | — | — | 40 | 40 | 50 | 50 | 50 | — | — | — |
| | (C) | 1 | 1 | 1 | 1 | 1 | 1 | 1 | 1 | 1 | 1 | 1 | 1 |
| | (D) | — | — | — | — | — | — | — | 3 | 3 | — | — | — |
| Elongation at break (%) | | 551.0 | 223.7 | 210.0 | 340.0 | 530.0 | 550 | 620 | 550 | 750 | 57.6 | 24.0 | 114.0 |
| Breaking strength (MPa) | | 5.0 | 0.8 | 0.2 | 0.1 | 1.2 | 0.4 | 0.2 | 0.2 | 0.1 | 2.4 | 1.0 | 0.7 |
| Tensile modulus (MPa) | | 24.3 | 1.4 | 0.2 | 0.2 | 0.5 | 0.1 | 0.03 | 0.05 | 0.02 | 5.5 | 4.2 | 1.1 |

As above, since the components (A-1) to (A-4) used in Examples 1 to 9 had a low viscosity at 25° C. or 50° C., the compositions containing those components was excellent in handleability. Further, the cured products of those compositions exhibited high elongation at break.

The invention claimed is:

1. A composition comprising:

a compound represented by the following formula (1)

(1)

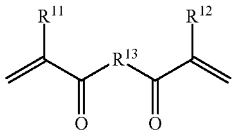

wherein $R^{11}$ and $R^{12}$ each represent a hydrogen atom, and $R^{13}$ represents a divalent group having a polyoxyalkylene chain, and wherein the polyoxyalkylene chain has from 300 to 361 of oxyalkylene groups and is a random copolymer chain consisting of an oxyethylene group and an oxypropylene group; and at least one additional polymerizable compound selected from the group consisting of 2-ethylhexyl acrylate, 4-hydroxybutyl acrylate, 2-acryloyloxyethyl succinate, and isodecyl acrylate, wherein the content of the additional polymerizable compound is from 50 parts by mass to 70 parts by mass based on 100 parts by mass of the sum of the compound represented by the formula (1) and the additional polymerizable compound.

2. The composition according to claim 1, wherein the compound represented by the formula (1) has a weight average molecular weight of 5000 or more.

3. The composition according to claim 1, wherein the compound represented by the formula (1) has a viscosity at 25° C. of 200 Pa·s or less.

4. The composition according to claim 1, wherein the at least one additional polymerizable compound comprises one selected from the group consisting of 2-ethylhexyl acrylate and isodecyl acrylate.

5. The composition according to claim 1, wherein the at least one additional polymerizable compound comprises 4-hydroxybutyl acrylate.

6. The composition according to claim 1, wherein the polyoxyalkylene chain has from 320 to 361 of oxyalkylene groups.

* * * * *